(12) United States Patent
Shan et al.

(10) Patent No.: US 7,792,817 B2
(45) Date of Patent: Sep. 7, 2010

(54) SYSTEM AND METHOD FOR MANAGING COMPLEX RELATIONSHIPS OVER DISTRIBUTED HETEROGENEOUS DATA SOURCES

(75) Inventors: Eric Yu-sen Shan, Saratoga, CA (US); Huong Thu Morris, Los Gatos, CA (US)

(73) Assignee: International Business Machines Corporation, Armonk, NY (US)

( * ) Notice: Subject to any disclaimer, the term of this patent is extended or adjusted under 35 U.S.C. 154(b) by 564 days.

(21) Appl. No.: 11/109,459

(22) Filed: Apr. 19, 2005

(65) Prior Publication Data

US 2006/0235838 A1    Oct. 19, 2006

(51) Int. Cl.
*G06F 7/00* (2006.01)
*G06F 17/00* (2006.01)
*G06F 17/30* (2006.01)
*G06F 3/48* (2006.01)

(52) U.S. Cl. .................. 707/709; 707/797; 707/705; 715/805

(58) Field of Classification Search .................. None
See application file for complete search history.

(56) References Cited

U.S. PATENT DOCUMENTS

| | | | | |
|---|---|---|---|---|
| 6,154,748 A | 11/2000 | Gupta et al. | ................ | 707/102 |
| 6,633,889 B2 | 10/2003 | Dessloch et al. | ............ | 707/103 |
| 6,823,495 B1 * | 11/2004 | Vedula et al. | ................ | 715/805 |
| 6,990,636 B2 * | 1/2006 | Beauchamp et al. | ........ | 715/764 |
| 7,257,588 B2 * | 8/2007 | Keith, Jr. | ..................... | 707/101 |

OTHER PUBLICATIONS

Kshitij et al. "Logical Information Modeling of Web-accessible Heterogeneous Digital Assets", IEEE internal Forum, Apr. 22, 1998, pp. 266-275.*

* cited by examiner

*Primary Examiner*—Apu M Mofiz
*Assistant Examiner*—Susan Y Chen
(74) *Attorney, Agent, or Firm*—Ryan, Mason & Lewis, LLP

(57) ABSTRACT

A relationship and navigation data repository can interface with a central data model and contains templates that define relationships among data from a number of distributed heterogeneous data sources. An integration engine is coupled to the relationship and navigation data repository, and can receive a query command and determine which of the heterogeneous data sources and which of the templates the query applies to, and then calculate the desired query result, responsive to the command, based on the relevant data sources and templates. The distributed heterogeneous data sources are managed by a system and method that involves obtaining pre-existing definitional data, instantiating in-memory nodes for the data, initializing a relationship attribute and an entity attribute for each of the nodes, and then forming an updated navigation tree structure therefrom.

6 Claims, 8 Drawing Sheets

FIG. 4

| PART NUMBER | NAME | TYPE | VERSION | MATURITY |
|---|---|---|---|---|
| P316 | RIGHT AXLE | L2 | 5 | 20% |
| P315 | LEFT AXLE | L2 | 5 | 20% |
| S420 | WHEEL | L2 | 5 | 100% |
| S421 | WHEEL | V15 | 11 | 100% |
| S422 | WHEEL | V15 | 11 | 100% |
| S423 | WHEEL | V15 | 11 | 100% |
| T330 | LOWER PANEL | C2 | 4 | 80% |
| T334 | SIDE PANEL | C3 | 4 | 89% |
| T332 | UPPER PANEL | C4 | 3 | 79% |
| T018 | BACK SEAT | C17 | 9 | 57% |
| T032 | FRONT PASSENGER | C21 | 8 | 100% |
| T099 | MAIN SEAT | C24 | 14 | 50% |

NEXT 12 >>

ACME X12 [subassembly – parts]
├─Interior [subassembly – parts]
│  ├─Engine
│  └─Frame [subassembly – parts]
│  ...
└─Exterior [coordinator]
   ├─John Smith [manager]
   ├─Fred Jones [manager]
   ├─Tom Riley
   └─George O'Connor ● subassembly – parts
○ coordinator
○ manager ○ depth ☐
○ all
○ save (GENERALIZED) NAVIGATION TREE

SYSTEM AND METHOD FOR MANAGING COMPLEX RELATIONSHIPS OVER DISTRIBUTED HETEROGENEOUS DATA SOURCES

FIELD OF THE INVENTION

The present invention relates to the data processing arts, and more particularly relates to a system and method for managing relationships among a plurality of distributed heterogeneous data sources.

BACKGROUND OF THE INVENTION

Integration of data from a variety of data sources is desirable in many enterprises. At present, attention has been focused on straightforward data querying and mapping in a distributed environment of heterogeneous data sources, involving data base management systems, knowledge bases, flat file systems, forms and spreadsheet applications, and the like. Such data querying typically allows users to specify search criteria using a query language such as structured query language (SQL), while data mapping is used to translate the queries and results between the heterogeneous back-end systems and the centralized integration platform. Although large-scale integration solutions are currently being built to offer efficient data retrieval, none support an infrastructure for complex relationship management of the data. Currently, specifications for data integration typically involve only explicit data mapping from multiple data sources. For example, U.S. Pat. No. 6,633,889 to Dessloch et al. teaches the mapping of persistent data objects residing in multiple data sources into a single, reusable software component accessible to an object-oriented programming language application performed by a computer, for multi-data base access to data that may be physically distributed and stored in disparate database management systems. A single virtual data object can be created based on registered data objects, and the virtual data object may be wrapped as a reusable software component.

Prior art solutions typically do not promote the use and identification of implicit information, i.e., complex relationship definition, on top of traditional explicit mapping. Further, in prior art systems, the user must traditionally issue multiple queries to piece together a final answer, for example, to develop a management chain. The user typically must have an overall view of the system's schema and structure in advance in order even to formulate appropriate queries. Finally, prior art systems are typically limited to the retrieval of explicit data and do not allow retrieval and maintenance of logical implications between the explicit pieces of data through generalized data structures.

In view of the foregoing, it is desirable to provide a system and method for managing complex relationships over distributed heterogeneous data sources. The system and method should promote use and identification of implicit information, that is, complex relationship definition, in addition to traditional explicit mapping, and should provide the user with the flexibility of defining any sort of desired relationship in a conceptually intuitive and visually explicit manner using, for example, extensible markup language (XML) scripts. It would also be desirable if the system and method permitted easy navigation by the user without requiring complex query formulation. Yet further, it would be desirable if the system and method allowed users to retrieve additional "implicit" data by treating the navigation structure and assembly itself as being a complex form of data.

SUMMARY OF THE INVENTION

The present invention, which addresses the needs identified in the prior art, provides a system and method for managing complex relationships over distributed heterogeneous data sources. In one aspect, a system integration platform is provided which manages the plurality of distributed heterogeneous data sources as well as a central data model that is configured to contain entities and/or attributes that are mapped and/or translated from the data sources. The management can be in response to a query command, for example, from a user. The platform can determine a desired query result corresponding to the command. The platform can include a relationship and navigation data repository that is configured to contain relationship templates that define relationships among the data from the different data sources, and also to interface with the central data model. The system integration platform can further include an integration engine coupled to the relationship and navigation data repository. The engine can be configured to receive the query command, determine which of the data sources and which of the templates the query command applies to, and to calculate the desired query result responsive to the query command.

In another aspect of the invention, a method of constructing a navigation tree structure for managing a plurality of distributed heterogeneous data sources is provided. The method include the steps of obtaining pre-existing definitional data, instantiating a plurality of in-memory nodes for the pre-existing definitional data, initializing at least a relationship attribute and an entity attribute for each of the nodes, and forming an updated navigation tree structure from the given nodes having the given attributes.

In still a further aspect of the present invention, a method of processing a query command associated with a plurality of distributed heterogeneous data sources is provided. The method includes obtaining the query command, and, responsive to the command, either creating a navigation session or loading a pre-existing navigation session. The method further includes passing the query command and either the new navigation session or pre-existing navigation session to an integration engine, and then identifying and interpreting, by using the integration engine, pertinent definition and computation templates that are associated with the query command. The method further includes computing and retrieving a desired query result, based at least in part on at least one of the definition and computation templates, from pertinent distributed heterogeneous data sources.

In yet a further aspect of the present invention, a system for constructing a navigation tree structure for managing a plurality of distributed heterogeneous data sources is provided. The system includes a relationship and navigation data repository and an integration engine. The integration engine is coupled to the relationship and navigation data repository, and is configured to obtain pre-existing definitional data from the relationship and navigational data repository and/or one or more of the distributed data sources. The integration engine is further configured to instantiate a plurality of in-memory nodes for the definitional data and to initialize at least a relationship attribute and an entity attribute for each of the nodes. The integration engine is further configured to form an updated navigation tree structure from the given nodes having the given attributes.

A more complete understanding of the present invention, as well as further features and advantages of the present invention, will be obtained by reference to the following detailed description and drawings.

BRIEF DESCRIPTIONS OF THE DRAWINGS

FIG. 4 shows a navigation tree structure configured for display to a user;

DETAILED DESCRIPTION OF PREFERRED EMBODIMENTS

Figure 1:
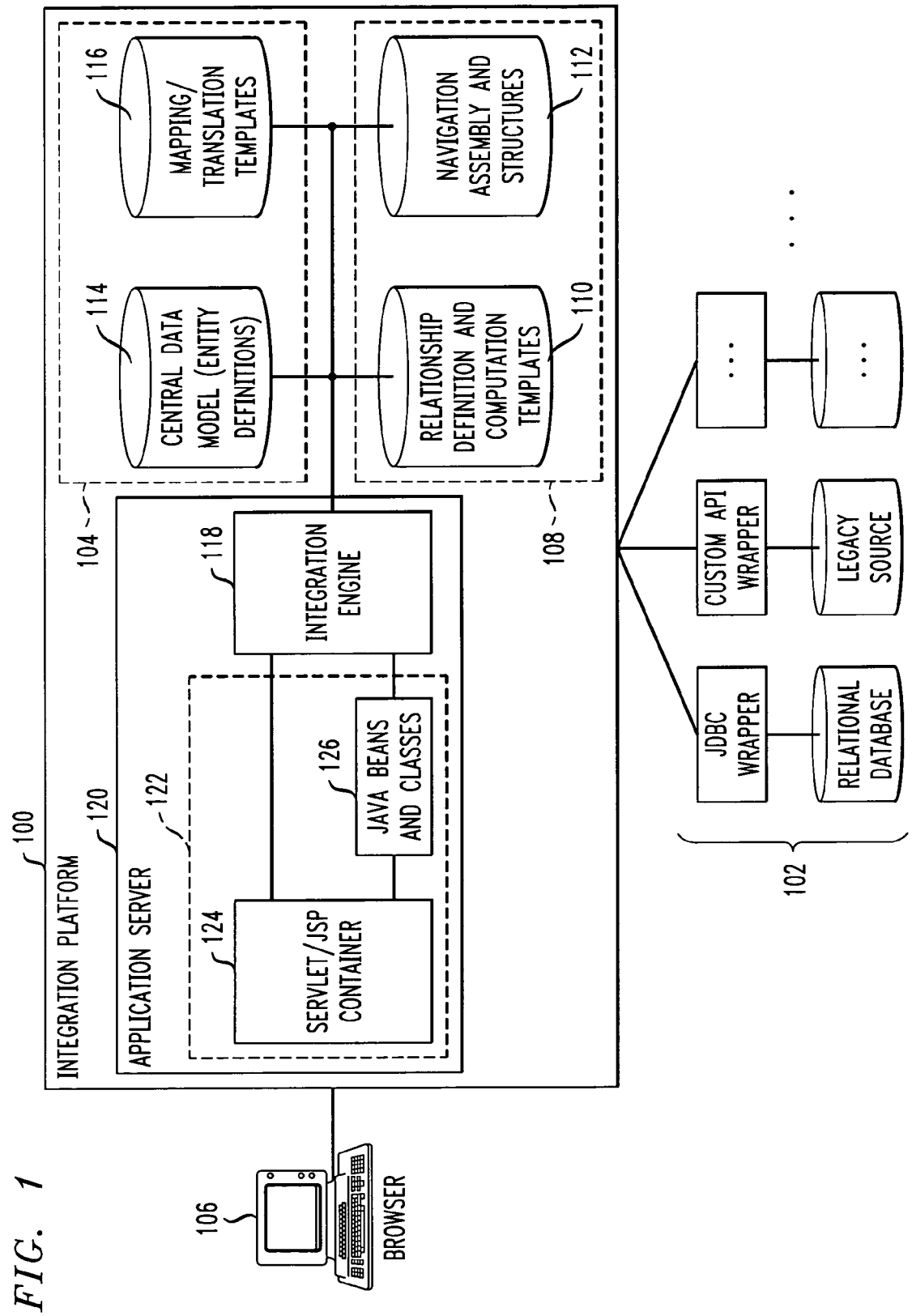
FIG. 1 shows a systems integration platform in accordance with the present invention.

Reference should now be had to FIG. 1 which depicts a system integration apparatus (also referred to as a platform) 100 according to an embodiment of the present invention. The platform 100 manages a plurality of distributed heterogeneous data sources 102 and a central data model 104. The central data model 104 is configured to contain entities and/or attributes that are mapped and/or translated from the data sources 102. The platform 100 determines a desired query result in response to a query command, which can be received, for example, from an external browser 106. It will be appreciated that (just as in a traditional integration platform using data federation) each of the data sources 102 can have data that can flow into the platform 100 through, for example, appropriate connections and wrappers (such as a JDBC (Java database connectivity) wrapper or a custom API (application program interface) wrapper).

The platform 100 includes a relationship and navigation data repository 108 that is configured to contain relationship templates 110 that define relationships among the data from the data sources 102. The relationship templates 110 define relationships among data within individual data sources 102, and also define relationships among data in different data sources 102. The relationship and navigation data repository 108 is configured to interface with the central data model 104. The relationship and navigation data repository 108 can optionally include a navigation assembly and structure repository 112, and the central data model 104 can optionally include entity definitions 114 and mapping/translation templates 116.

The system integration platform also includes an integration engine 118 that is coupled to the relationship and navigation data repository 108. The integration engine 118 is configured to receive the query command, and to determine which of the plurality of data sources 102 and which of the templates contained in block 110 the query command applies to, so as to identify pertinent data sources and pertinent templates. The integration engine is further configured to calculate the desired query result in response to the query command, based on the pertinent data sources and the pertinent templates. The integration engine 118 can be implemented as, for example, an XML engine that determines which data sources 102 a query applies to and the methods and parameters for computing the relationship in each pertinent back end system 102. The latter function can be performed, for example, by interpreting relationship definition and computation templates 110 (for example, in the form of scripts) in repository 108. Results can be mapped/translated to the central data model 104 if desired.

The integration engine 118 can optionally be part of an application server 120. The application server can also include an interface module 122 that is coupled to the integration engine 118 and through which the integration engine 118 receives the query command. By way of example, as shown in FIG. 1, the interface module can preferably be constructed using an appropriate servlet/JSP (Java server pages) container 124 and appropriate JAVA beans and classes 126. However, any type of appropriate application (C++ or Visual Basic, for example) working through a browser interface can be employed instead. The integration engine can optionally calculate the result formed as a navigation tree structure (to be discussed more fully below) that has a plurality of source data items, and the interface module 122 can be configured to format at least part of the navigation tree structure in a manner adapted to be output from the platform 100 in a readily accessible fashion (for example, to the external browser 106). Once the integration engine 110 has determined desired results, the results, together with at least desired portions (such as active portions) of the navigation tree data structure can be passed back to servlets 124 in interface 114 for display of the tree and updating of the interface, and/or can be persisted, e.g., to repository 112. The interface module 122 can optionally format at least part of the navigation tree structure into a query interface 400, to be discussed below with respect to FIG. 4. The relationship and navigation data repository 108 can be configured to store the navigation tree structure in block 112.

Continued reference should be given to FIG. 1 for discussion of a system for constructing a navigation tree structure for managing a plurality of distributed heterogeneous data sources 102. The elements of the system for constructing the navigation tree structure include the relationship and navigation data repository 108 and the integration engine 118, which is coupled to the relationship and navigation data repository 108. The integration engine 118 is configured to obtain pre-existing definitional data from the relationship and navigation data repository 108 and/or at least one of the distributed data sources 102, and to instantiate a plurality of in-memory nodes for the definitional data. Further, the integration engine is configured to initialize at least a relationship attribute and an entity attribute for each of the nodes, such that a plurality of relationship attributes are initialized. At least some of the relationship attributes define relationships among data in different ones of the data sources. The relationship attributes and entity attributes of the nodes can correspond, for example, to any of items 502, 510, 512, 514, 516 discussed below with respect to FIG. 5. Finally, the integration engine 118 can be configured to form an updated navigation tree structure, for example, of the type described herein, from the given nodes having the given attributes. Thus, it will be appreciated that the system elements just discussed are one possible system that can implement the method discussed below with respect to FIG. 8. Accordingly, the pre-existing definitional data can be a result stored in one of the data sources 102, a result stored in the relationship and navigation data repository 108, or a sub-graph stored in the relationship and navigation data repository 108. The integration engine 118 can then be configured to carry out any of the additional method steps described below with respect to FIG. 8.

Figure 2:
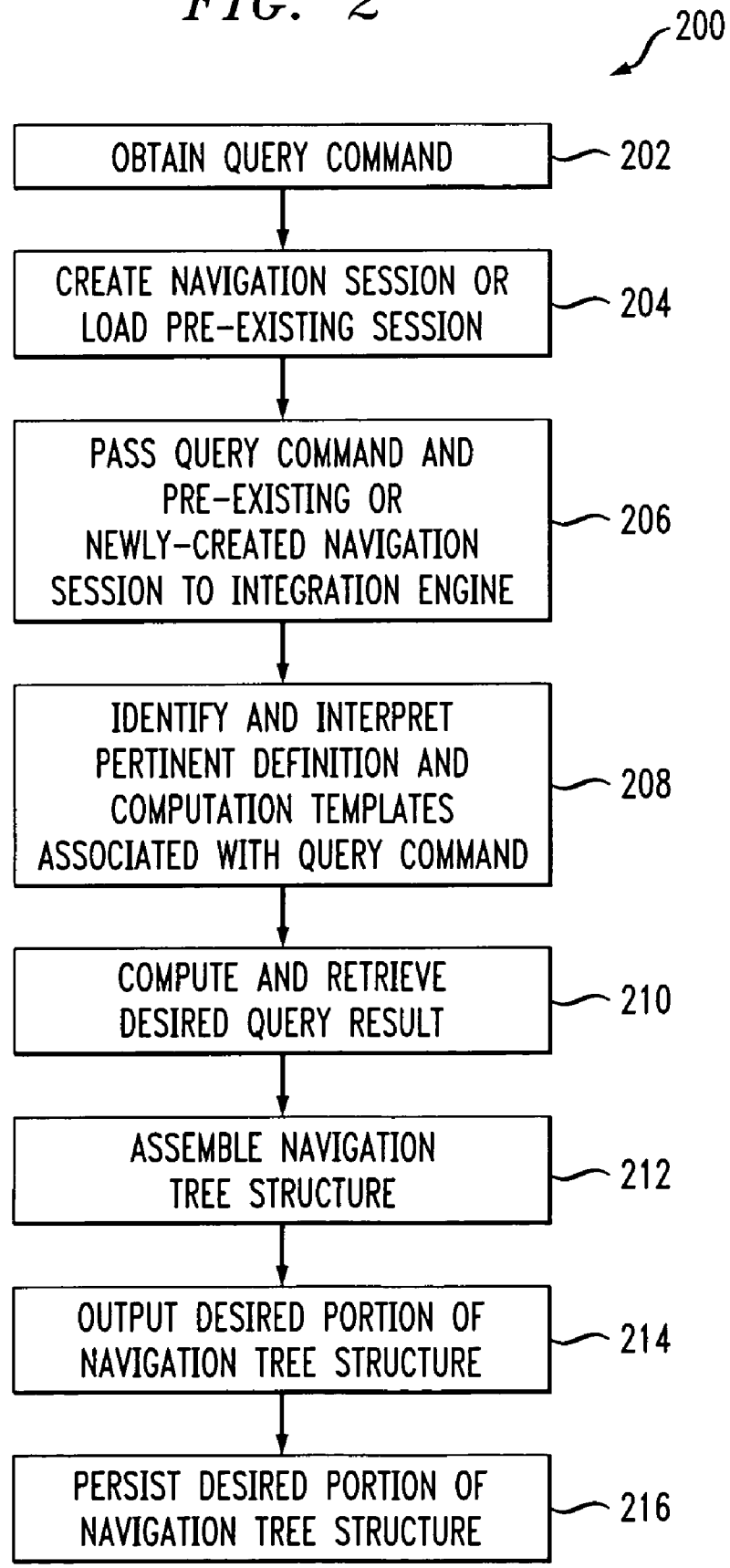
FIG. 2 shows a flow chart for a method of processing a query command in accordance with the present invention.

Reference should now be had to FIG. 2 which depicts a flow chart 200 of a method, in accordance with the present invention, of processing a query command associated with a plurality of distributed heterogeneous data sources such as data sources 102. The method includes the steps of obtaining the query command, as in block 202, and then, responsive to the query command, either creating a navigation session or loading a pre-existing navigation session, as per block 204. The command can be obtained, for example, from external browser 106 through interface 400 (discussed below). The method includes the further step of passing the query command and either the new navigation session or the pre-existing navigation session that has been loaded to an integration engine, such as integration engine 118, as shown in block 206. The method further includes the step of identifying and interpreting pertinent definition and computation templates associated with the query command, as shown at block 208. The identifying and interpreting step is typically performed with the aid of the integration engine 118, and at least some of the templates define relationships among data in different ones of the data sources 102. Finally, at block 210, the step of computing and retrieving a desired query result is depicted. The desired query result will typically be based at least in part on at least one of the definition and computation templates 110, and the desired query result is typically retrieved from pertinent ones of the distributed heterogeneous data sources 102 using the relationship information from the definition and computation templates. The desired query result can be assembled into a navigation tree structure using techniques as described above, and a desired portion can be formatted for output, as described above, while a portion not desired for output can be persisted to memory. These steps are depicted in blocks 212, 214, 216. (Refer also to examples of active and inactive regions given below with respect to FIG. 7.) Accordingly, the desired query result can be written to persistent storage formatted as a navigation tree structure or can be formatted for output and subsequent display, and portions of the navigation tree structure can be selected for either the storage or display options, as desired.

Figure 3:
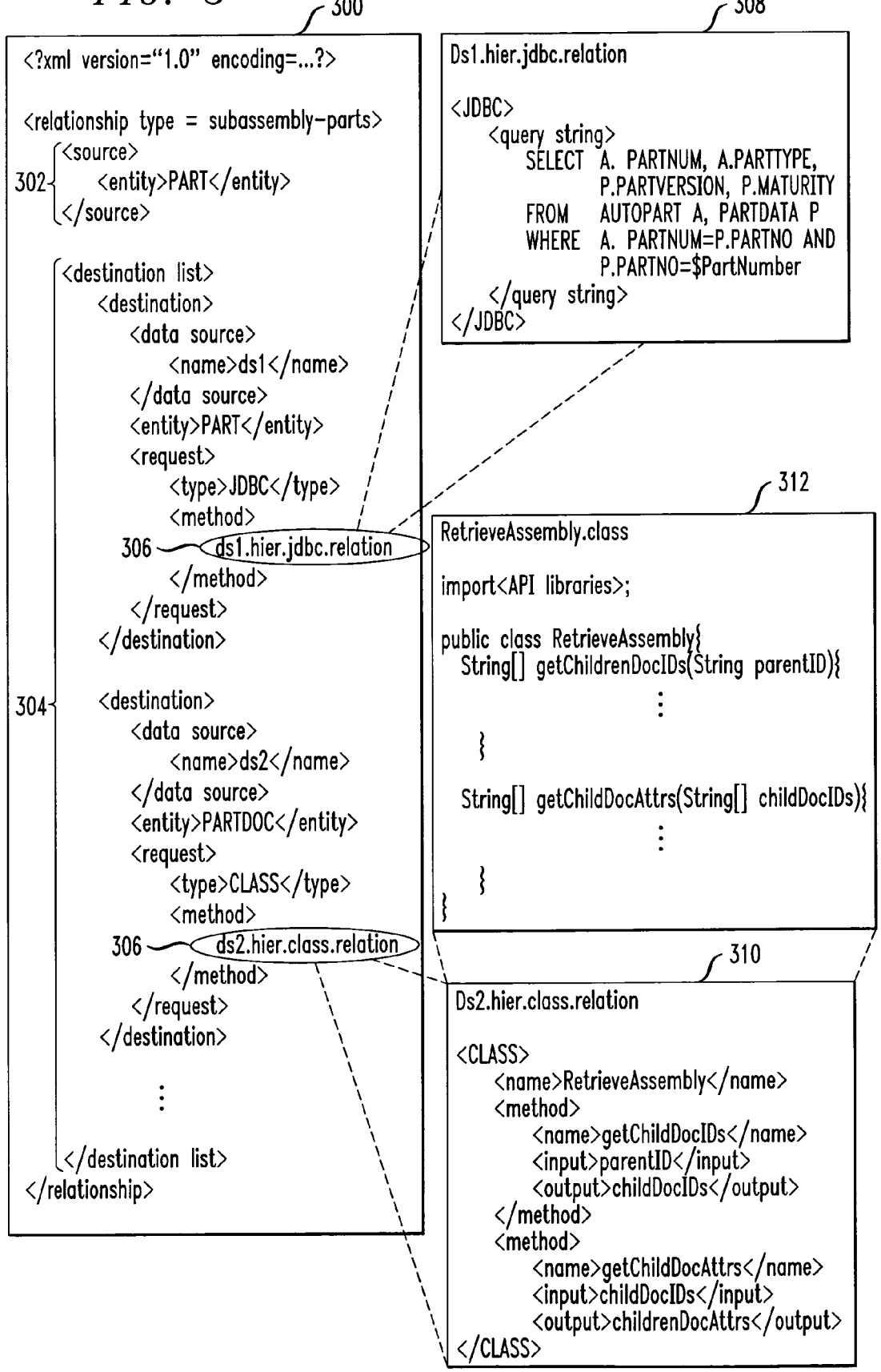
FIG. 3 shows exemplary relationship definition and computation templates in accordance with the present invention.

Attention should now be given to FIG. 3 which depicts exemplary contents of the relationship and navigation data repository 108, which would typically be stored in the relationship definition and computation templates 110. Appropriate scripts and/or classes can be employed; templates for defining new relationships and XML scripts for existing relationship definitions can be used as desired. Exemplary XML definition and computation scripts, as well as associated classes, are presented in FIG. 3 for the relationship "subassembly-parts." The definition script 300 can identify the source entity 302 (that is, the entity type of the source item) as well as a destination list 304 including pertinent back-end data sources relevant to the relationship. In the example shown in FIG. 3, the source entity is of the type PART, such as, e.g., an automobile engine, which can be navigated by its subassembly, and at least two back-end sources are specified (corresponding, for example, to two of the distributed data sources 102 in FIG. 1). That is to say, at least two of the back-end sources contain information that should be included in the subassembly of the source entity, for example, the fan blades for the automobile engine. Within method tags 306, the exemplary script 300 also specifies computation specific scripts 308, 310 which describe how to compute the desired relationship. The computation specific scripts can include a variety of items, including JDBC queries, web services invocations, compiled proxy code, proprietary application program interfaces (APIs), and the like. The actual classes can be as long as desired, depending on the complexity of the relationships to be defined. When the computation mechanism involves compiled class files 312, the specification script can include the parameters and outputs of each function in the correct calling order, where the input parameters are matched to the source entity's attributes or previous output values.

While a specific example has been shown in FIG. 3, it will be appreciated that, in general, the relationship and navigation data repository 108 of platform 100 can include a plurality of relationship definitions defining a plurality of relationships; each of the definitions can in turn identify a source entity 302, an associated destination list 304 of pertinent ones of the data sources, and at least one computation definition reference 306 to appropriate definitions 308, 310 and the like. The computation definitions such as 308, 310 can define how to compute corresponding ones of the relationships, in response to being referenced by a computation definition reference 306.

Referring now to FIG. 4, the interface module 122 can optionally format at least part of the navigation tree structure into a query interface 400. Interface 400 can include data representative of a first portion 402 for specification of a desired one of the source data items from the navigation tree structure and can also include data representative of a second portion 404 for specification of a pertinent one of the relationship templates. If desired, the query interface 400 can include data representative of a third portion 406 that specifies a desired depth of navigation into the navigation tree structure. The portion 402 can display the user's navigation thus far in a given session. The portion 408 can display the results of a current query.

In preferred embodiments of the invention, querying can take place with a minimal number of selections or inputs, for example, by mouse clicks. For example, a user can click on a source data item 410 and a desired relationship 404 by which to query. The example shown in FIG. 4 depicts a subassembly parts breakdown for an exemplary "Acme X12" automobile. As noted, where desired, the query interface can include data that is representative of portion 406 for specifying the depth of navigation into the navigation tree structure. The "depth" option allows the user to specify how many levels (an integer number) to traverse, while the "all" option traverses all levels. Typically, both options can expand the navigation by recursively applying the query to all nodes or results in the results set in a depth-first manner. For example, clicking on "John Smith," "manager," and "all" will retrieve the entire management chain starting with John Smith and up to the Chief Executive Officer. Clicking on "Acme X12," "subassembly-parts," and "depth" specifying a depth of 3, will retrieve a tree hierarchy of all the sub-components of the automobile to a depth of 3. Thus, in the exemplary embodiment depicted in FIG. 4, operations for navigating through the data and persisting the data (using the save option in portion 406) and for specifying further querying options can be simply triggered through clicks in the depicted interface. Interface 400 can preferably be implemented through Java servlets and Java server pages (JSP pages) tied, e.g., to Java beans and classes (see items 124, 126 in FIG. 1). As noted above, other appropriate applications such as C++ and Visual Basic can be employed. Interface 400 can manage the relationship and navigation structure for the session in conjunction with integration engine 118, and can reside on application server 120, or all or part of it can be downloaded to a user machine running browser 106 (elements 106, 118, 120 have been discussed above with respect to FIG. 1).

Figure 5:
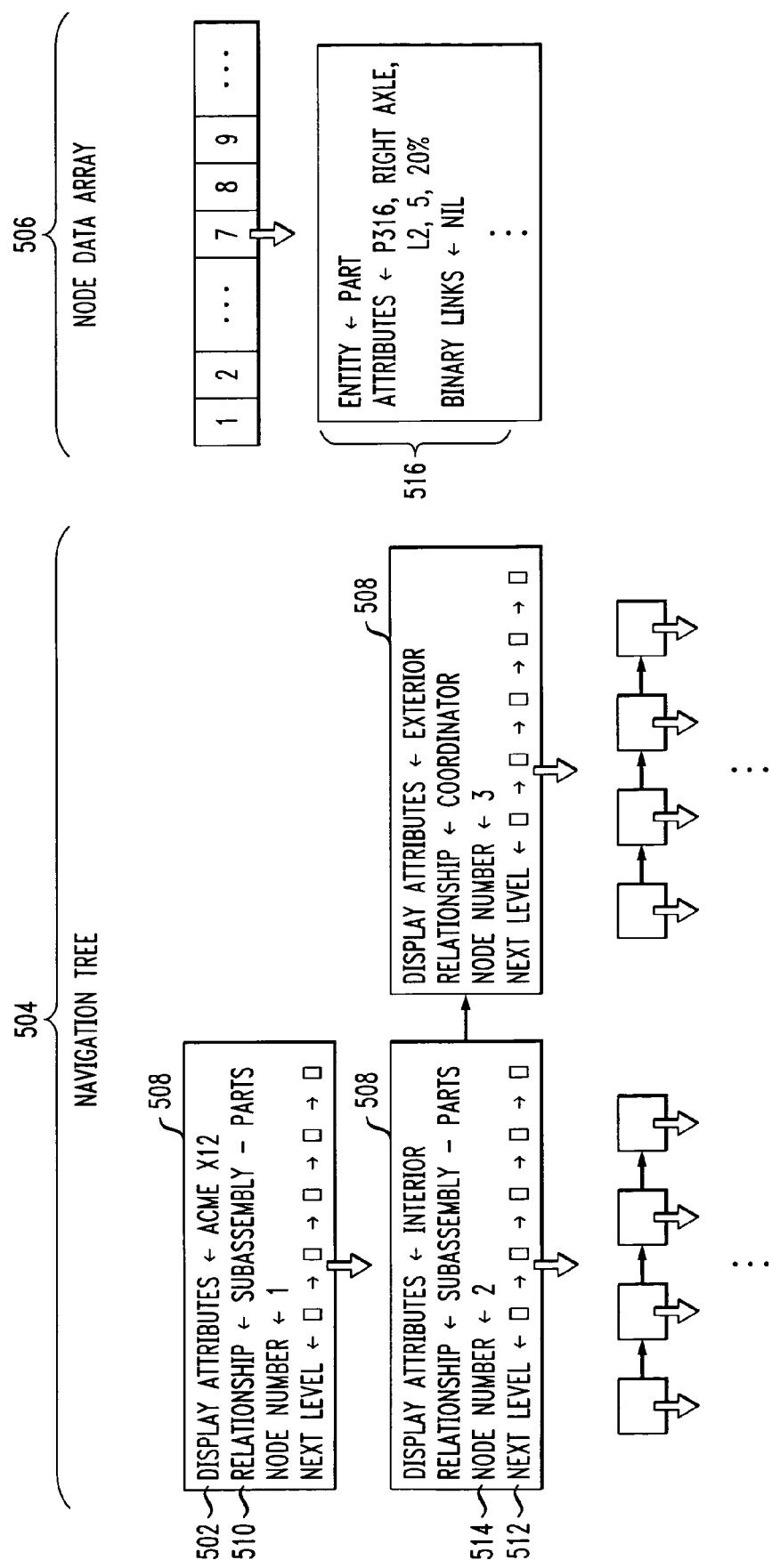
FIG. 5 shows a navigation tree and a node data array of a navigation tree structure in accordance with the present invention.

Now viewing FIG. 5, aspects of the navigation tree structure 500 of the present invention are depicted. As noted above, the navigation tree structure 500 can have a plurality of source data items; the source data items can typically include the first item specified, for example by clicking, at any level. Source data items are depicted in portion 402 shown in FIG. 4, and corresponding display attributes 502 are shown in FIG. 5. The navigation tree structure 500 can comprise a navigation tree portion 504 and a node data array 506. The navigation tree portion 504 is essentially a hierarchy of lists; as shown in FIG. 5 it represents the top levels depicted in FIG. 4. The navigation tree structure 500 and portion 504 are designed to aid in constructing the interface of FIG. 4, and the hierarchy of lists allows for simple building and formatting of the navigation information into the interface seen by users; for example, in the form of a web interface. The representation seen in FIG. 4 is a natural representation of a depth-first traversal of the navigation tree structure. "Depth-first traversal" is a term of art known to those skilled in graph theory; one proceeds down as far as possible to a leaf node and then moves to the next sibling. It is to be contrasted to a "breadth-first" traversal where one proceeds through all siblings first. The navigation tree portion 504 can be employed for presentation purposes, and the nodes 508 in the tree can be configured to hold data for presentation. Each node 408 can include the aforementioned display attributes 502, to identify each data item in the navigation tree structure in the interface. The relationship portion 510 can store the relationship that is used to query with, in the event that the data item served as the source entity in a query. The next level portion 512 can maintain a list of data items in the next immediate level down of navigation. Finally, the node number 514 can be used as an index for handling requests, for example, in dynamic web pages.

The navigation tree structure 500, as noted, can also include a node data array 506. Appropriate attributes 516 associated with a given node can then be used as parameters, for example, to methods specified in the relationship definition and computation templates 110. Indexing of the source data item by an integer is helpful in that it eliminates the need to traverse the entire navigation tree structure to retrieve the data item's non-display attributes, and it also avoids the necessity of inserting all the attributes of every data item into the interface so that any user request would have all appropriate attribute values accessible to pass to the query handler. Note that data items, if desired, can be linked to large binary files, such as computer-aided design (CAD) files for automobile and airplane parts, which can be specified, for example, in the binary links list depicted in attributes 516. In view of the discussion of FIG. 5, it will be appreciated that the navigation tree structure can include a plurality of nodes 508 that are configured to enable presentation to the user of a depth-first traversal of the navigation tree structure 500 and that the structure can further include the node data array 506 wherein pertinent data, typically including at least an entity type and at least one attribute, is stored for each of the plurality of nodes 508. Again, as noted, each of the nodes 508 in the navigation tree portion 504 of the navigation tree structure 500 can include an attribute designated as a display attribute 502, a relationship 510, a node number 514, and a next level 512, and the attributes can be used as parameters with the relationship templates 110. Note that an entity can be envisioned as an object that one desires to present to a user to interface with to allow navigation through the system.

Figure 6:
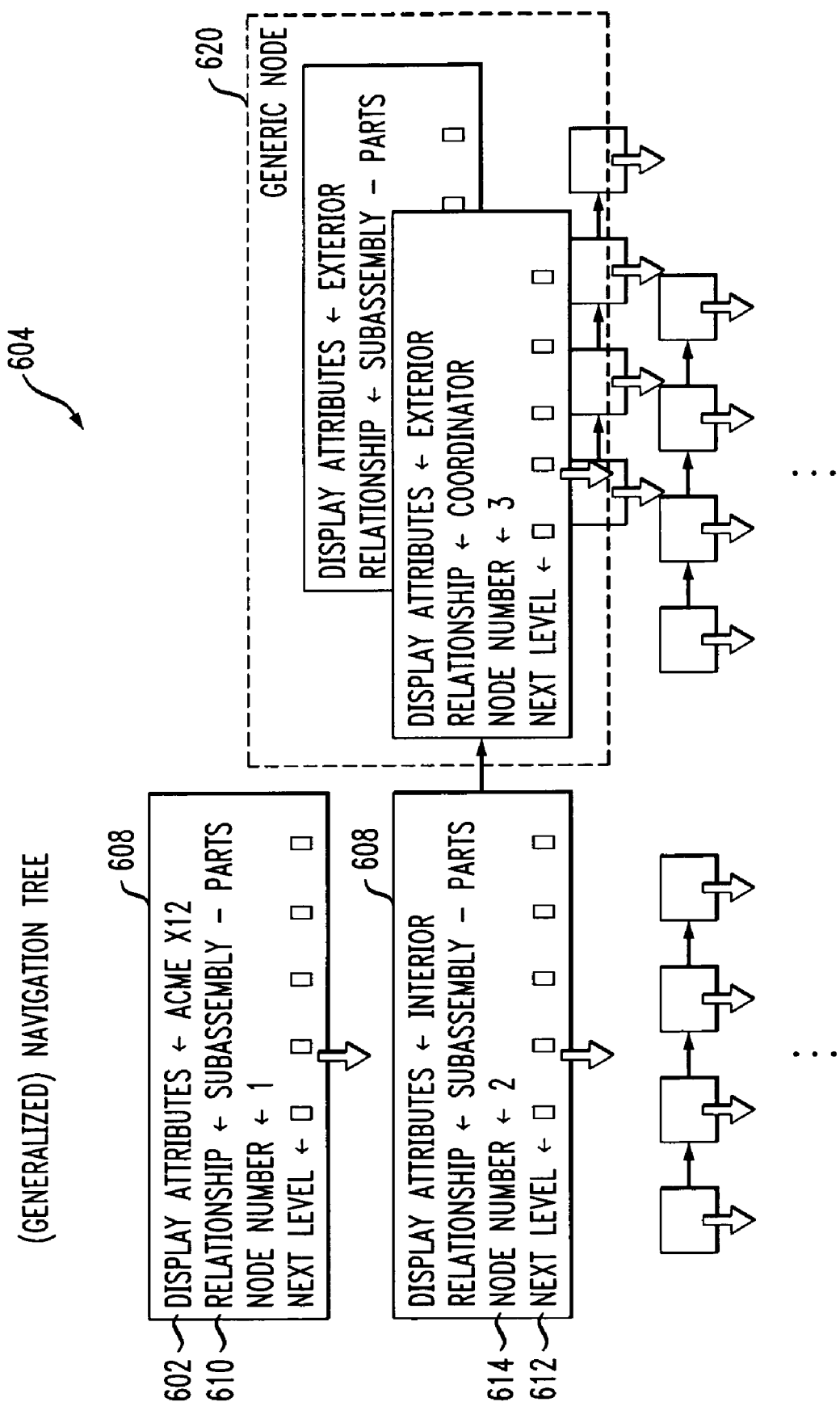
FIG. 6 shows a generalized navigation tree structure.

Reference should now be had to FIG. 6, which depicts a generalized navigation tree 604. The navigation tree 504 of FIG. 5 has been expanded for depiction in FIG. 6, and like elements have received the same reference character incremented by 100. Elements 602, 608, 610, 612, 614 are similar to elements 502, 508, 510, 512, 514 in FIG. 5 and are not discussed again. In order to complement the flexibility of the relationship definition and computation templates 110 in specifying multi-dimensional relationships (where an entity is linked to other entities through several relationships), as well as the expressive power of the system in terms of general application, the navigation tree portion 504 in FIG. 5 has been extended as a generalized navigation tree data structure 604 in FIG. 6. By way of example, FIG. 6 illustrates how the "exterior" entity can be associated to other entities through both the "coordinator" and "subassembly-parts" relationships. The generalized navigation tree data structure is thus built up of generic nodes 620 that keep track of all pertinent relationships navigated by the user for a given entity, in this case, "exterior".

Figure 7:
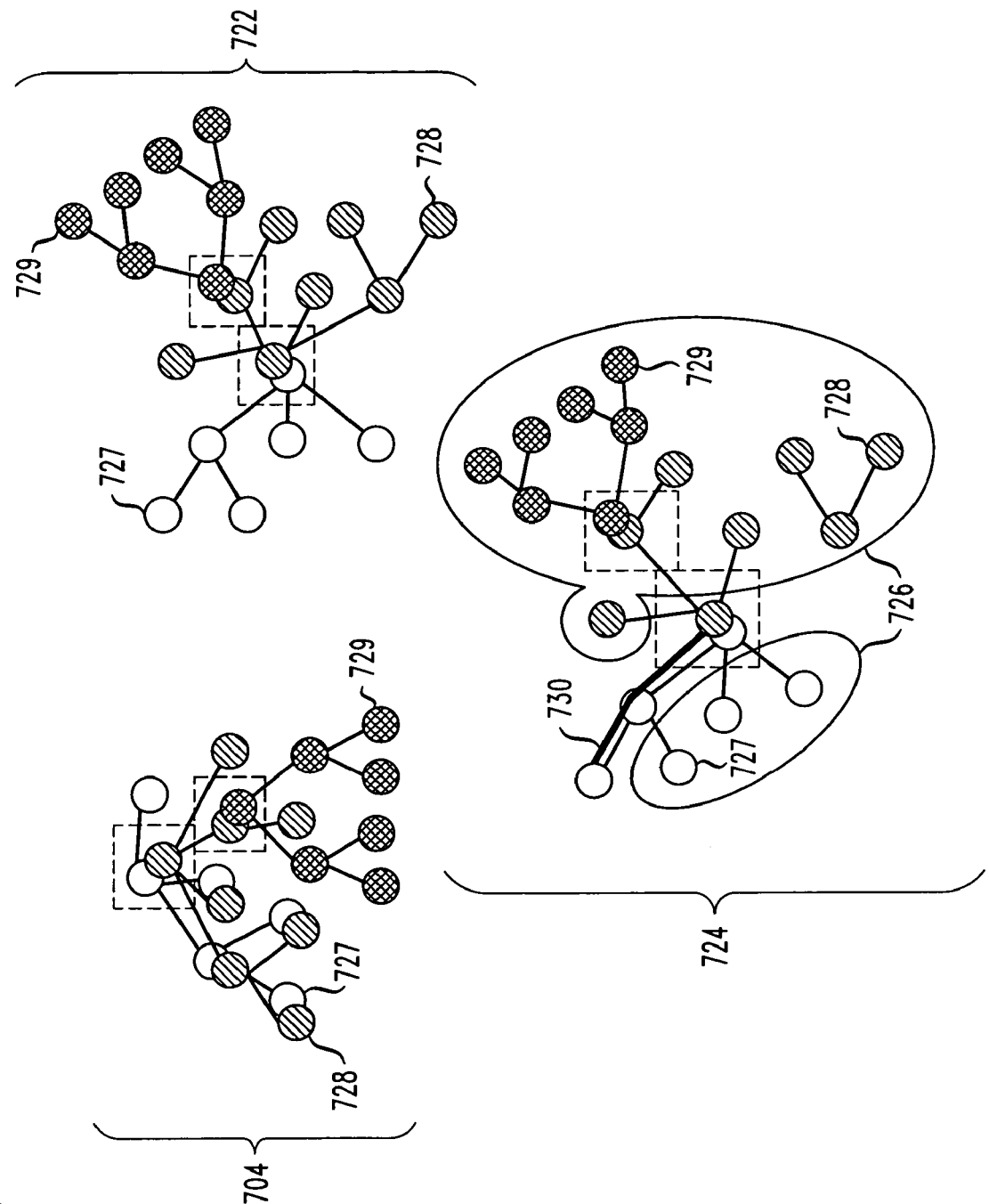
FIG. 7 shows a multi-dimensional navigation tree structure.

Attention should now be given to FIG. 7 which diagrams a multi-dimensional navigation tree structure 704 and a generalized graph 722. Again, to the extent that there is commonality between items depicted in FIG. 7 and those depicted in FIG. 5 and FIG. 6, reference characters in FIG. 7 have been incremented by 100 with respect to FIG. 6 and by 200 with respect to FIG. 5. FIG. 7 also depicts a user drill-down navigation path 724 with inactive zones 726. Suppose that users were allowed to navigate along exactly one relationship for each entity. In such a case, the navigation tree could resemble, for example, just the unhatched structure 727 (corresponding, e.g., to the "subassembly" relationship), just the single-hatched structure 728 (corresponding, e.g., to the "management" relationship), or just the double-hatched structure 729 (corresponding, e.g., to some other relationship). However, because the present invention permits the definition and computation of multiple relationships per entity, one should permit nodes to be traversed along multiple relationships, leading to the multi-dimensional navigation tree structure 704. The top dotted box in 704, containing an unhatched circle and a single-hatched circle, can represent, for example, two relationships (e.g., subassembly, management) applying to the "exterior" entity. While the structure is somewhat complex in appearance, we can use the generalized navigation tree structure 704 and its generic nodes (represented by the circles and not separately numbered) to represent the multi-dimensional navigation tree structure as an easily extensible and cleanly organized flat (or two-dimensional) generic graph 722. In this form, then, one can keep track of an n-dimensional relationship graph in a data tree structure that is easily scalable for efficient navigation and traversal. Now, both the relationship definition/computation scripts and the underlying in-memory data structures allow for a high level of flexibility in terms of describing relationships, in particular, as a general graph.

Note that, depending on the viewing scheme, several dimensions of a navigation structure are potentially lying "inactive" in the background, unviewed by the user at the current moment. Thus, entire dimensions can be adaptively persisted to storage (for example, a disk or other type of memory, often a non-volatile form of memory) and brought back to the memory as the navigation tree structure requires with respect to the user's view of the navigation tree structure. If the user has drilled down a certain path in the navigation tree structure, represented by heavy line 730, leaving the rest of the navigation tree structure unexpanded, a significant fraction of the relationship graph will be inactive, as indicated by regions 726. Given the graph representation of the present invention, these "inactive" zones can be efficiently located, and the granularities at which these zones can be persisted to memory (again, typically a disk or other type of non-volatile memory, but any appropriate form of memory can be used) extend very naturally from the size and location of the sub-graphs or sub-trees that make up the zones 726.

In view of the foregoing description of FIG. 7, it will be appreciated that the platform of the present invention can, where desired, have a navigation tree structure that includes both active and inactive regions; the inactive regions, as noted, are depicted as item 726 in FIG. 7, while the remaining nodes in item 724 constitute the active region. Further, the inactive region 726 of the navigation tree structure can be persisted to the relationship and navigation data repository 108, while active regions of the navigation tree structure can be formatted in a manner adapted to be output from the platform 100 in a readily accessible fashion. For example, the formatting can be conducted by the interface module 122 for display to a user employing an external browser 106.

Figure 8:
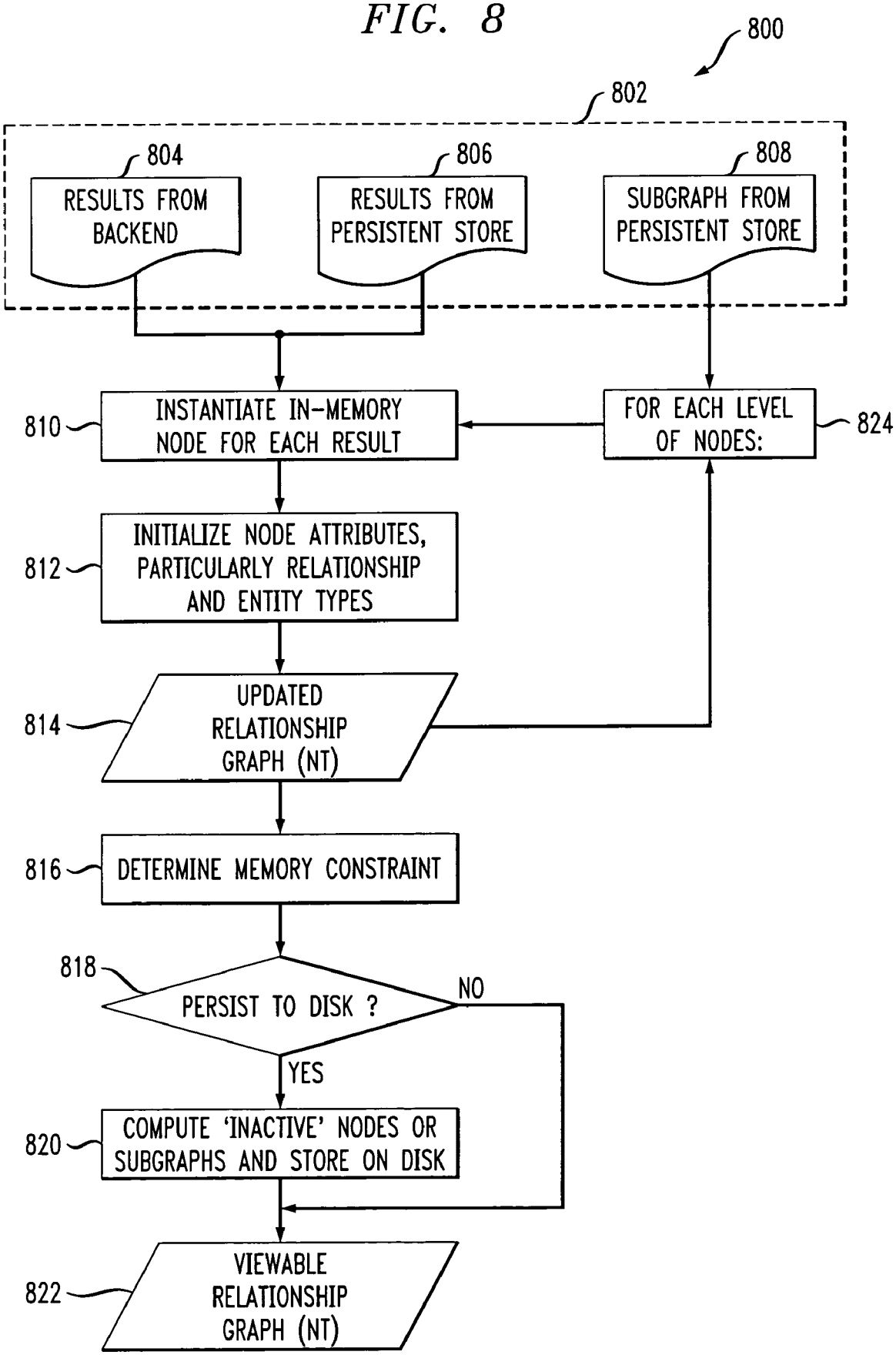
FIG. 8 shows a method of constructing a navigation tree structure in accordance with the present invention.

Reference should now be had to FIG. 8, which depicts a flow chart for a method, in accordance with the present invention, of constructing a navigation tree structure (which can be of the type discussed above) for managing a plurality of distributed heterogeneous data sources (such as the data sources 102). The method 800 includes the step 802 of obtaining pre-existing definitional data. The pre-existing definitional data can be, for example, a result stored in a back-end, such as one of the data sources 102, as depicted at block 804; a result from persistent storage, such as central data model 104 or relationship and navigation data repository 108, as depicted at block 806; or a subgraph from persistent storage, as depicted at block 808. As depicted at block 810, the method further includes the step of instantiating a plurality of in-memory nodes for the pre-existing definitional data (the in-memory nodes can optionally be instantiated in an iterative manner); and as depicted at block 812, initializing a relationship attribute and/or an entity attribute for each of the nodes. The relationship attributes can define relationships among data in the same data source, and unlike previous systems, can also define relationships among data in different data sources. Method 800 can further include the step of forming an updated navigation tree structure from the aforementioned nodes having the given attributes, per block 814. In the case when the pre-existing definitional data is a sub-graph, the instantiating, initializing, and forming steps can be repeated for each level of nodes, as depicted at block 824. Note that a subgraph, like any graph, can be thought of as a hierarchy of any arbitrary number of levels of nodes.

As indicated at blocks 816, 818, 820, method 800 can optionally include the additional step of determining a memory constraint associated with a first memory, comparing the updated navigation tree structure to the memory constraint, and then, if the updated navigation tree structure exceeds the memory constraint, performing additional steps. The additional steps to be performed in such case include determining first portions of the navigation tree structure that are inactive and second portions of the navigation tree structure that are active, storing at least the first portions of the navigation tree structure to a second memory, and retaining in the first memory the second portions of the navigation tree structure (block 822). Examples of active and inactive portions have been discussed above with respect to FIG. 7. By way of example and not limitation, the first memory can typically include a RAM, while the second memory can typically include a disk or other persistent storage embodied in relationship and navigation data repository 108, and particularly in navigation assembly and structure repository 112. The memory constraint can be associated with, for example, the number of users or the size of the navigation tree data structure, as well as the available memory resources.

System and Article of Manufacture Details

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

The computer systems and servers described herein each contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

It is to be understood that the embodiments and variations shown and described herein are merely illustrative of the principles of this invention and that various modifications may be implemented by those skilled in the art without departing from the scope and spirit of the invention.

What is claimed is:

1. A system integration apparatus, said apparatus comprising:

a graphic user display, wherein a relationship and navigation data repository is configured to contain relationship templates defining relationships among data from a plurality of distributed heterogeneous data sources, wherein each of the data sources having data that flows into the apparatus, said relationship templates defining said relationships among both data within individual ones of the sources and data in different ones of the sources, said relationship and navigation data repository being configured to interface with a central data model configured to contain at least one of entities and attributes that are at least one of mapped and translated from the data sources; and an integration engine coupled to the graphic user display and said relationship and navigation data repository, said integration engine being configured to:

receive a query command, wherein the integration engine receives the query command through the graphic user display;

determine which of the plurality of distributed heterogeneous data sources and which of said templates the query command applies to, so as to identify pertinent data sources and pertinent templates; and calculate a desired query result formed as a navigation tree structure, responsive to the query command, wherein calculating the desired query result comprises applying the query only to the pertinent data sources and said pertinent templates, as determined from the plurality of distributed heterogeneous data sources, and wherein the navigation tree structure is output from said apparatus in a form accessible to the user, and wherein the navigation tree structure comprises a plurality of nodes configured to enable presentation to the user of a depth-first traversal of said navigation tree structure, further wherein the navigation tree structure comprises one or more source data items in a desired relationship specified via one of the relationship templates, wherein the relationship templates comprise subassembly parts, coordinator and manager.

2. The apparatus of claim 1, wherein at least said part of said navigation tree structure is formatted into a query interface, said query interface comprising:
   data representative of a first portion for specification of a desired one of said source data items from said navigation tree structure; and
   data representative of a second portion for specification of a pertinent one of said relationship templates.

3. The apparatus of claim 2, wherein said query interface further comprises data representative of a third portion for specification of a desired depth of navigation into said navigation tree structure.

4. The apparatus of claim 1, wherein said relationship and navigation data repository is further configured to store said navigation tree structure.

5. The apparatus of claim 1, wherein:
   said navigation tree structure further comprises a node data array with pertinent data, including at least an entity type and at least one attribute, for each of said plurality of nodes.

6. The apparatus of claim 1, wherein said relationship and navigation data repository further comprises:
   a plurality of relationship definitions defining a plurality of relationships, each of said relationship definitions identifying a source entity, an associated destination list of pertinent ones of the data sources, and at least one computation definition reference; and
   a plurality of computation definitions defining how to compute corresponding ones of said relationships responsive to said at least one computation definition reference of a corresponding one of said relationship definitions.

* * * * *